United States Patent [19]
Hosotsubo

[11] Patent Number: 6,009,485
[45] Date of Patent: *Dec. 28, 1999

[54] INFORMATION PROCESSING APPARATUS AND METHOD, AND STORAGE MEDIUM STORING CONTROL PROGRAMS

[75] Inventor: Toshihiko Hosotsubo, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/649,075

[22] Filed: May 16, 1996

[30] Foreign Application Priority Data

May 18, 1995 [JP] Japan ..................... 7-144112
May 14, 1996 [JP] Japan ..................... 8-118936

[51] Int. Cl.$^6$ ................ H04N 1/32; G06F 1/32
[52] U.S. Cl. .............. 710/100; 358/404; 358/296; 358/440; 358/444; 714/56; 709/200; 379/100
[58] Field of Search ............... 395/280, 200.1, 395/185.09, 868; 358/444, 296, 404, 440; 710/100, 48; 714/56; 709/200; 379/100

[56] References Cited

U.S. PATENT DOCUMENTS 5,517,652 5/1996 Miyamoto et al. .............. 709/219
5,579,126 11/1996 Otsuka .......................... 358/403

Primary Examiner—Ayaz R. Sheikh
Assistant Examiner—Rupal D. Dharia
Attorney, Agent, or Firm—Fitzpatrick, Cella, Harper & Scinto

[57] ABSTRACT

An information processing apparatus for exchanging information with a plurality of other apparatuses connected thereto through a bidirectional interface includes a storage unit for storing attribute information of IDs and users of the plurality of other apparatuses, a search unit for searching the storage unit for IDs of apparatuses belonging to designated attribute information, and a transmission unit for transmitting information to the plurality of apparatuses searched by the search unit. An information processing method using this information processing apparatus, and a storage medium storing control programs for the information processing apparatus and method are also disclosed.

65 Claims, 9 Drawing Sheets

FIG. 8

| USER NAME | NETWORK ID | FLOOR | USER NAME | NETWORK ID | FLOOR |
|---|---|---|---|---|---|
| A | 001 | 5F | H | 019 | 4F |
| B | 010 | 4F | I | 004 | 5F |
| C | 003 | 5F | J | 040 | 1F |
| D | 021 | 3F | K | 035 | 2F |
| E | 011 | 4F | L | 042 | 1F |
| F | 005 | 5F | M | 007 | 5F |
| G | 030 | 2F | N | 015 | 4F |

FIG. 9

| USER NAME | NETWORK ID | FLOOR | USER NAME | NETWORK ID | FLOOR |
|---|---|---|---|---|---|
| A | 001 | 5F | H | 019 | 4F |
| B | 010 | 4F | I | 004 | 5F |
| C | 003 | 5F | J | 040 | 1F |
| D | 021 | 3F | K | 035 | 2F |
| E | 011 | 4F | L | 042 | 1F |
| F | 005 | 5F | M | 007 | 5F |
| G | 030 | 2F | N | 015 | 4F |

INFORMATION PROCESSING APPARATUS AND METHOD, AND STORAGE MEDIUM STORING CONTROL PROGRAMS

BACKGROUND OF THE INVENTION

1. Field of the Invention

The present invention relates to an information processing apparatus and method, and a storage medium and, more particularly, to an information processing apparatus such as a host computer serving as a main function on a predetermined network, an information processing method using this information processing apparatus, and a storage medium storing control programs.

2. Related Background Art

In an information processing system in which an information processing apparatus such as a host computer and a plurality of output devices such as printers are connected on a predetermined network, when a specific individual wants to distribute a document to a plurality of persons, the document distributor as the specific individual specifies the ID numbers (identification numbers) of output devices of receivers as the plurality of persons and distributes a specific document to the specified output devices, thereby distributing the document to the plurality of persons.

In the conventional technique described above, however, the document distributor must specify output devices corresponding in number to the output devices owned by the receivers prior to the document distribution as described above. In addition, the document distributor must store the ID numbers (identifiers) corresponding in number to the output devices of terminals subjected to the document distribution. Therefore, when the number of receivers is large, the document distributor must perform a cumbersome operation for specifying the output devices.

SUMMARY OF THE INVENTION

The present invention has been made in consideration of the conventional problems described above, and has its object to provide an information processing apparatus and method capable of allowing a distributor to distribute a document to a plurality of receivers when the distributor inputs a print command once, and a storage medium storing control programs.

In order to achieve the above object of the present invention, there is provided an information processing apparatus for exchanging information with a plurality of other apparatuses connected thereto through a bidirectional interface, comprising storage means for storing attribute information of IDs and users of the plurality of other apparatuses, search means for searching the storage means for IDs of apparatuses belonging to designated attribute information, and transmission means for transmitting information to the plurality of apparatuses searched by the search means.

In order to achieve the above object of the present invention, there is also provided an information processing method in an information processing apparatus for exchanging information with a plurality of other apparatuses connected thereto through a bidirectional interface, comprising the storage step of storing attribute information of IDs and users of the plurality of other apparatuses in a memory, the search step of searching the memory for IDs of apparatuses belonging to designated attribute information, and the transmission step of transmitting information to the plurality of apparatuses searched in the search step.

In order to achieve the above object of the present invention, there is further provided a storage medium storing control programs used in an information processing apparatus for exchanging information with a plurality of other apparatuses connected thereto through a bidirectional interface, wherein the control program has a storage module for the storage step of storing attribute information of IDs and users of the plurality of other apparatuses in a memory, a search module for the search step of searching the memory for IDs of apparatuses belonging to designated attribute information, and a transmission module for the transmission step of transmitting information to the plurality of apparatuses searched by the search module.

In order to achieve the above object of the present invention, there is further provided an information processing apparatus comprising storage means for storing identifiers respectively unique to a plurality of terminal devices, group registration means for registering as one group at least two of the plurality of identifiers stored in the storage means, output command means for generating an output command for outputting predetermined information to a group registered in the group registration means, and transmission means for transmitting predetermined information to terminal devices associated with all identifiers belonging to the group when the command for outputting the predetermined information is generated by the output command means.

There is further provided an information processing method comprising the steps of registering as one group at least two of a plurality of stored identifiers after identifiers respectively unique to a plurality of terminal devices are stored, and transmitting predetermined information to terminal devices associated with all the identifiers belonging to a registered group when a command for outputting the predetermined information is output to the registered group.

BRIEF DESCRIPTION OF THE DRAWINGS

FIG. 8 is a view showing the window screen of an attribute information list according to the embodiment of the present invention;

FIG. 9 is a view showing the window screen of an attribute information selection display according to the embodiment of the present invention;

DETAILED DESCRIPTION OF THE PREFERRED EMBODIMENT

The embodiment of the present invention will be described with reference to the accompanying drawings.

Figure 1:
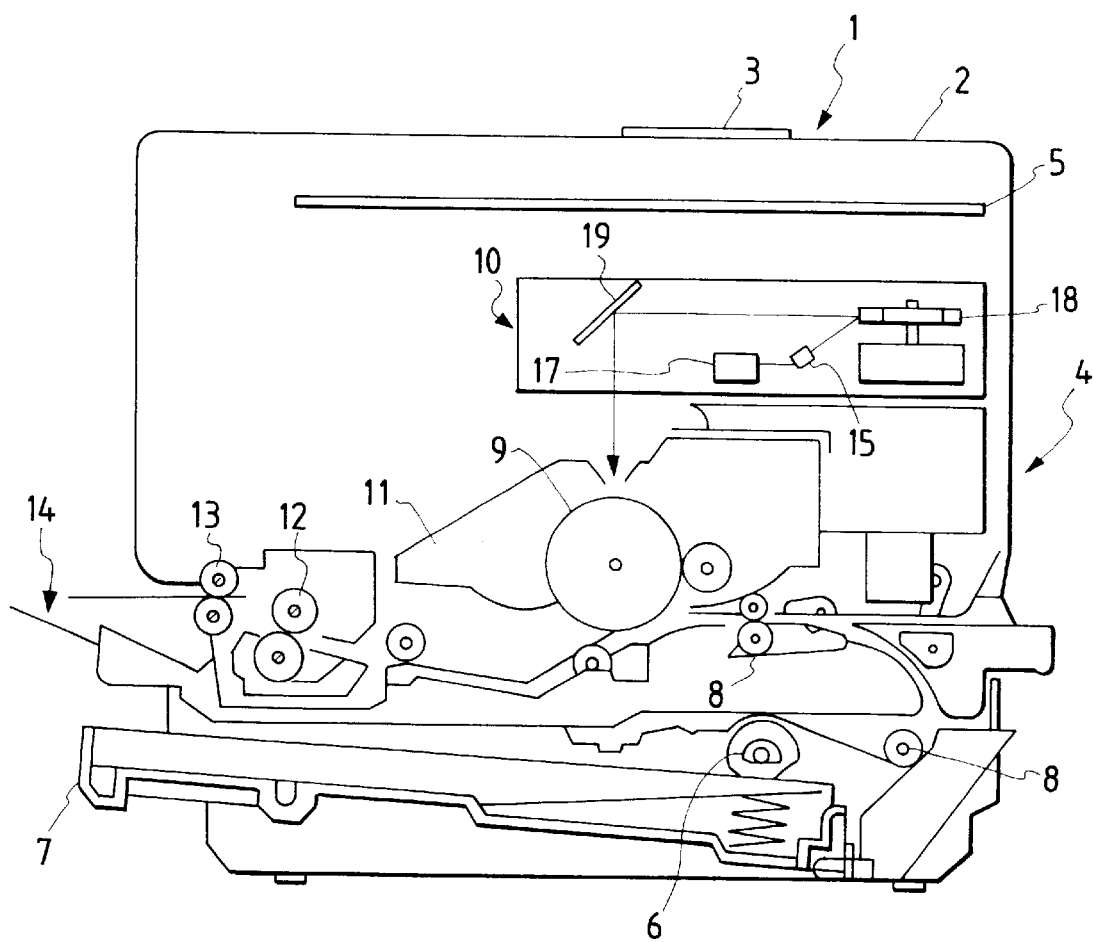
FIG. 1 is a sectional view showing the internal structure of a laser beam printer as an example of a printer controller according to an embodiment of the present invention.

FIG. 1 is a view showing the internal structure of a laser beam printer as an embodiment of an output apparatus according to the present invention. A laser beam printer 1 comprises an operation panel 3 formed on the upper surface of an apparatus main body 2 and having switches, an LED display unit, and the like, a printer main body 4 for performing a predetermined print operation, and a printer controller 5 for analyzing input character data and control data to control a print operation of the printer main body 4.

The printer main body 4 comprises a paper cassette 7 which has a paper feed roller 6 and in which predetermined recording paper sheets (cut sheets) are stored, an electrostatic drum 9 to which a recording paper sheet is supplied through an appropriate number of carriage rollers 8, an optical system 10 for irradiating a laser beam on the electrostatic drum 9, a developing unit 11 which is located around the electrostatic drum 9 and in which a toner of predetermined color is stored, a fixing unit 12 for fixing a toner image developed by the developing unit 11, and a delivery unit 14 for delivering a recording sheet printed with document data or the like outside the apparatus through delivery rollers 13.

The optical system 10 has a semiconductor laser 15 for emitting a laser beam having a predetermined wavelength, a laser driver 17 for driving the semiconductor laser 15, a rotary polygon mirror 18, and a reflecting mirror 19 for reflecting a laser beam incident through the rotary polygon mirror 18 to guide the laser beam onto the electrostatic drum 9.

In the laser beam printer 1 having the above arrangement, a video signal is input from the printer controller 5 to the laser driver 17, and ON/OFF switching of the laser beam emitted from the semiconductor laser 15 is controlled in accordance with the video signal. The laser beam is swung laterally by the rotary polygon mirror 18 to scan the surface of the electrostatic drum 9, and an electrostatic latent image of a character pattern or the like is formed on the electrostatic drum 9. The electrostatic latent image is developed through the developing unit 11. The toner image attracted on the electrostatic drum 9 is transferred to a recording paper sheet fed from the paper cassette 7. The toner image is fixed on the recording paper sheet by the fixing unit 12. The recording paper sheet is then delivered onto the delivery unit 14 through the delivery rollers 13.

Figure 2:
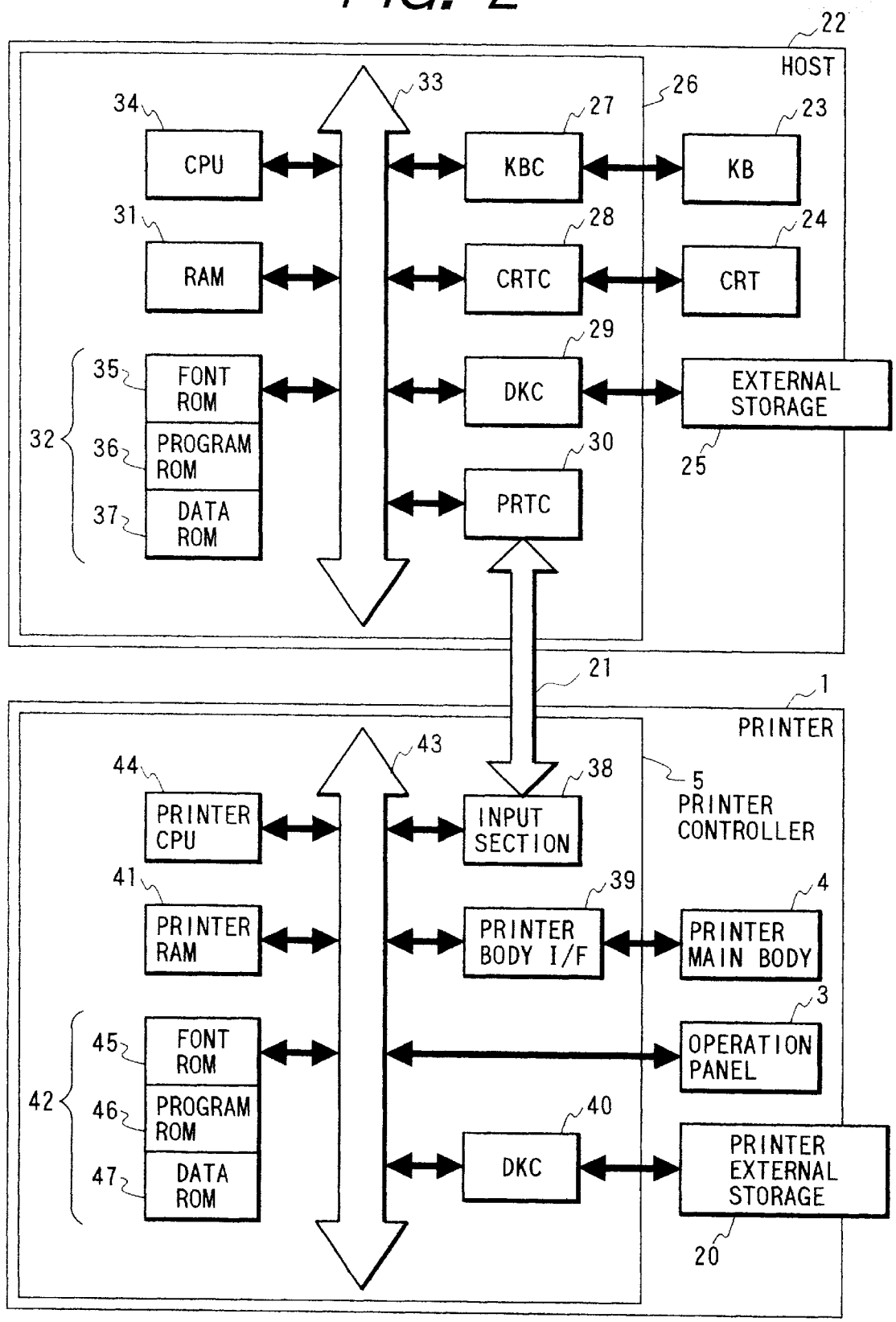
FIG. 2 is a system block diagram showing a document distribution system according to the embodiment of the present invention.

FIG. 2 is a block diagram of a document distribution system serving as an information processing system according to the present invention. In this document distribution system, the laser beam printer 1 to which a printer external storage 20 can be connected and a host computer 22 serving as an information processing apparatus are connected to each other through a predetermined network 21 for controlling the operation of a bidirectional interface such as a LAN (Local Area Network). Note that the printer external storage 20 stores font data, an emulation program for translating a printer control language of another language system, form data, and the like.

The host computer 22 comprises a keyboard 23 for allowing an operator to input arbitrary predetermined information (e.g., text data and graphic data), a display unit 24 (CRT) for displaying the predetermined information and the like, an external storage 25 such as a flexible or hard disk for storing a boot program, various application programs, font data, user files, edited files, and the like, and an information controller 26.

The information controller 26 comprises a keyboard controller (KBC) 27 for controlling key input information from the keyboard 23 and input information designated with a pointing device (not shown), a CRT controller (CRTC) 28 for controlling the CRT 24, a disk controller (DKC) 29 for controlling access to the external storage 25, a printer controller (PRTC) 30 for executing communication control processing with the laser beam printer 1, a RAM 31 which can temporarily store registration information such as a user name and an ID to be described later and has a work area function, a ROM 32 which prestores predetermined information, and a CPU 34 connected to the above components through a system bus 33 to control these components.

Figure 3:
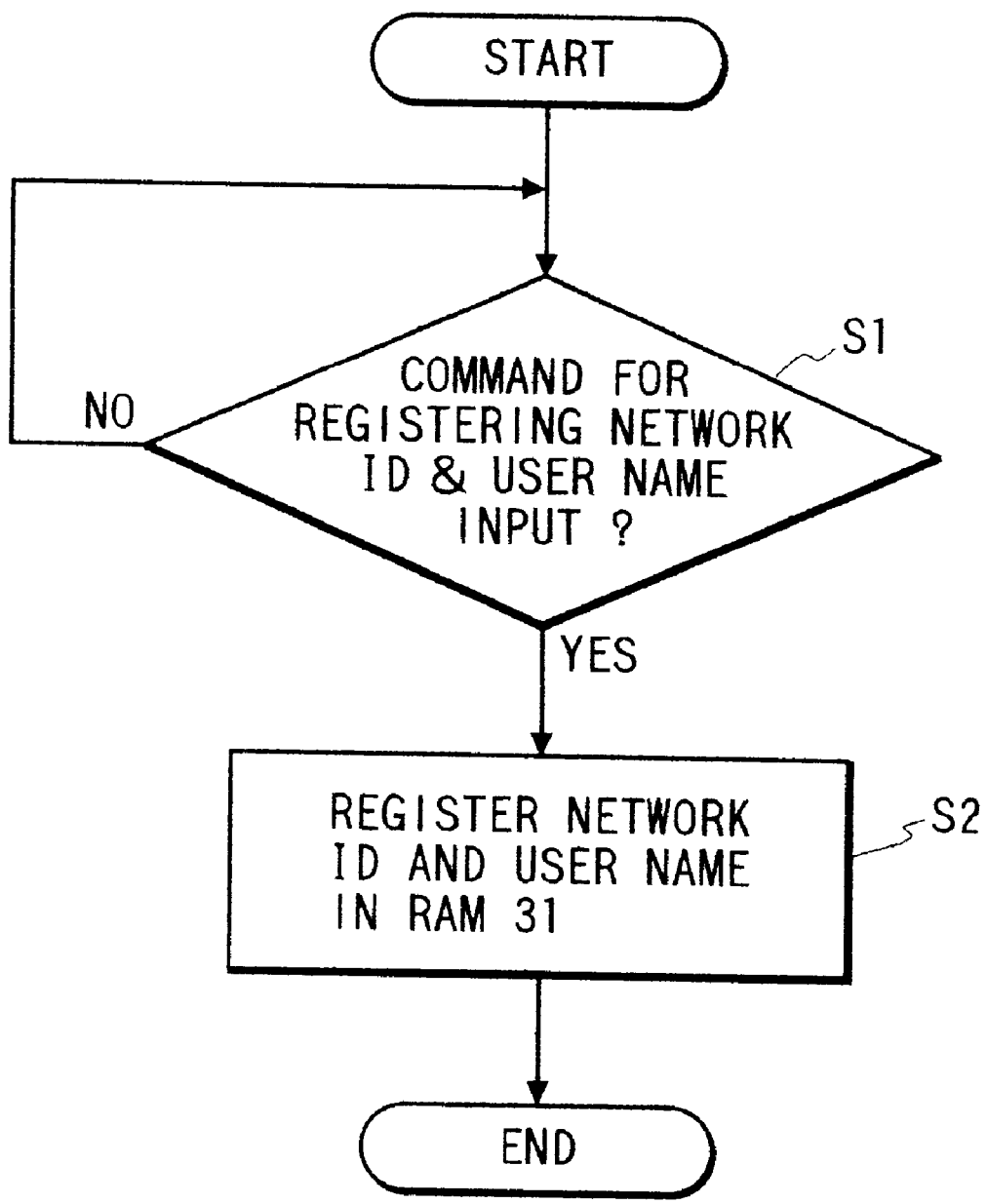
FIG. 3 is a flow chart showing a control program for registering network IDs and user names according to the embodiment of the present invention.
Figure 4:
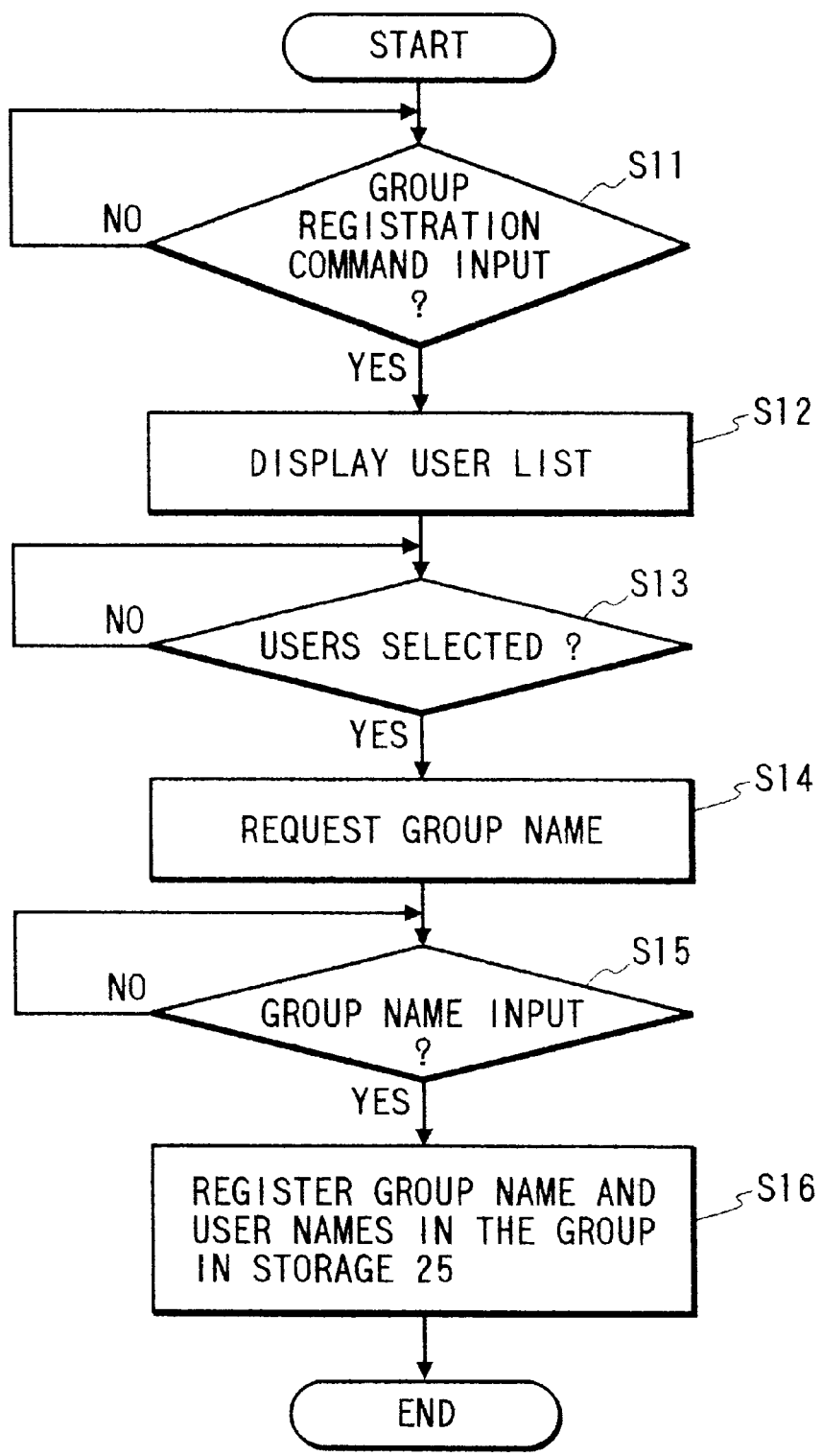
FIG. 4 is a flow chart showing another control program for registering a group according to the embodiment of the present invention.
Figure 5:
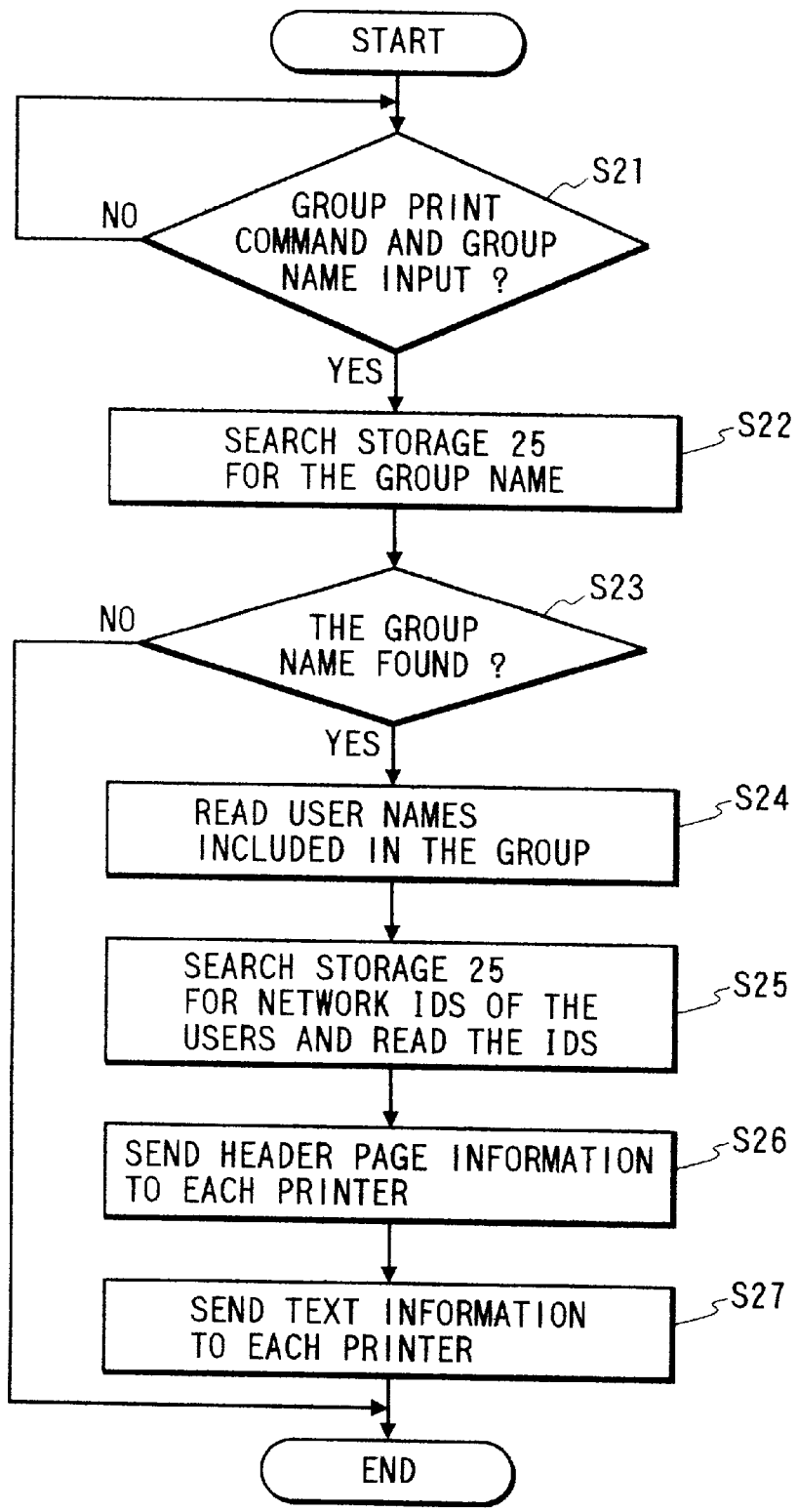
FIG. 5 is a flow chart showing still another control program for group output processing according to the embodiment of the present invention.

The ROM 32 has a font ROM 35 storing font data and the like used in document processing, a program ROM 36 a storing predetermined document processing program and control programs shown in FIGS. 3 to 5, and a data ROM 37 storing various types of data used in the above document processing. The CPU 34 uses the RAM 31 as a work area to execute the document program for executing document processing including various documents such as a graphic pattern, an image, characters, and a table (including spreadsheet calculation). More specifically, the CPU 34 develops (rasterizes) outline fonts in a display information area formed in the RAM 31 to allow "WYSIWYG" (What You See Is What You Get). The information displayed on the CRT 24 is directly printed and output. The CPU 34 opens various types of windows (FIGS. 8 to 10) registered on the basis of command information designated with a pointing device or the like and executes various types of data processing. Note that these various types of windows are stored in the data ROM 37.

The printer controller 5 comprises an input section 38 connected to the predetermined network 21 to exchange data with the host computer 22, a printer body interface (I/F) 39 for controlling an interface operation with the printer main body 4 (printer engine), a disk controller (DKC) 40 for controlling access to the printer external storage 20, a printer RAM 41 having an output information development area, an environmental information storage area, an NVRAM, and the like, a printer ROM 42 which prestores predetermined information, and a printer CPU 44 connected to the above components to control them.

The printer ROM 42 has a font ROM 45 which stores font data and the like used to generate output information (bit map data) to the printer main body 4, a program ROM 46 which stores a predetermined document processing program, and a data ROM 47 which stores various types of information used in the host computer 22, as needed. The printer CPU 44 outputs an image signal as output information to the printer main body 4 connected through the printer body interface 39. The CPUs 34 and 44 can communicate with the host computer 22 through the input section 38. Print information and the like of the laser beam printer 1 can be notified to the host computer 22. The printer RAM 41 can be expanded through an expansion port (not shown) to increase the memory capacity. The printer external storage 20 can be connected to additional printer external storages. More specifically, an optional card can be connected in addition to the built-in fonts, and a plurality of printer external storages 20 which store a plurality of emulation programs can be connected. The printer external storage 20 may have an NVRAM and may store printer setup information from the operation panel 3.

In the above document distribution system, the host computer 22 has a storage means (RAM 31) for storing attribute information such as ID numbers (identifiers) and user names respectively unique to a plurality of laser beam printers 1, a group registration means (RAM 31) for registering specific users as one group on the basis of, e.g., user names stored in the storage means, an output command means (CPU 34) for generating a command for outputting document information to the group registered in the group registration means, and a transmission means (CPU 34) for searching for user names and ID numbers which belong to the registered group and transmitting predetermined information to all the searched laser beam printers 1 belonging to the registered group when the output command means outputs the command for outputting the predetermined information.

FIG. 3 is a flow chart showing a control program for registering network IDs and user names.

The CPU 34 executes this control program to achieve the following operations.

More specifically, the CPU 34 determines in step S1 whether a command for registering an ID number (network ID) and user name on the predetermined network 21 for each laser beam printer 1 connected to the host computer 22 is input through the keyboard 23 or a pointing device (not shown). If YES in step S1, the network ID and the user name are registered in the RAM 31, and processing is ended (step S2).

In this manner, all the ID numbers and user names unique to the plurality of laser beam printers on the network are registered in the RAM 31.

FIG. 4 is a flow chart showing a control program for group registration.

The CPU 34 executes this control program to achieve the following operations.

Figure 10:
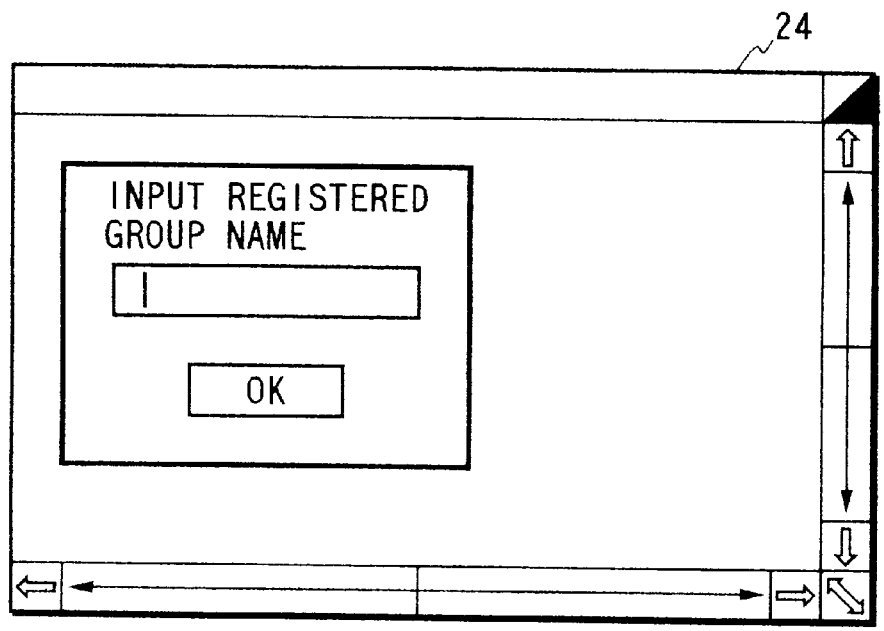
FIG. 10 is a view showing the window screen of input processing display for a registered group name according to the embodiment of the present invention.

More specifically, the CPU 34 determines in step S11 whether a group registration command is input through the keyboard 23 or a pointing device (not shown). If YES in step S11, the CPU 34 displays a user name list stored in the RAM 31 on the CRT 24, as shown in FIG. 8 (step S12). The CPU 34 determines whether the user selects a plurality of user names to be registered from the user name list (step S13). This selection is performed using the keyword 23 or a pointing device (not shown), and the selected user names and IDs are highlighted, as shown in FIG. 9. When the user names to be registered as one group are selected, a prompt for requesting the input of a group name to be registered is displayed, as shown in FIG. 10 (step S14). The CPU 34 determines whether such a group name is input (step S15). If YES in step S15, the attribute information such as user names and IDs belonging to this group is stored in the external storage 25 (step S16), and processing is ended.

In the flow chart of FIG. 3, the operation for registering network IDs and user names has been described. However, in addition to these attributes, a floor name representing a floor on which a printer is installed, a user's post (e.g., assistant section manager, section manager, department manager, office manager, or head office manager), the name of section/department to which a user belongs may be registered.

The operation for registering a newly, arbitrarily input group name has been described in the flow chart of FIG. 4.

However, an input group name may be a floor name or post described above.

FIG. 5 is a flow chart showing a control program for group output processing.

The CPU 34 executes this control program to achieve the following operations.

More specifically, the host computer 22 determines in step S21 whether a group print command for group printing and its group name are input through the keyboard 23 or a pointing device (not shown). If YES in step S21, the CPU 34 searches the storage 25 for this group name (step S22) to determine whether the designated group name is found (step S23). If NO in step S23, processing is directly ended, and a message representing that the designated group name is not found is displayed on the CRT 24. However, if YES in step S23, attribute information such as user names belonging to this group name is loaded from the external storage 25 to the RAM 31 (step S24), and the attribute information such as the network ID of the user is searched from the external storage 25 and loaded in the RAM 31 (step S25). Thereafter, the CPU 34 transmits a header page (including information of a distributor name and the like) representing the header of the document distribution to the network ID (step S26). The print information of the main body is then transmitted to each laser beam printer 1 (step S27), and processing is ended.

According to the document distribution system, when the document distributor executes a print command once, desired information can be simultaneously printed and output to all receivers, thereby minimizing the cumbersome operation of the distributor to input a print command.

In the above document distribution system, document distribution processing is executed on the host computer 22 side. However, the document distribution processing may be executed on the laser beam printer 1 side serving as the output device. In this case, processing of the CPU 34 on the host computer 22 side as described in the above embodiment is executed by the printer CPU 44, the network IDs, the user names, and the like are stored not in the external storage 25 but in the printer external storage 20, and the search contents are loaded from the printer external storage 20 to the printer RAM 41. In addition, input information is entered not by the keyword 23 or the like but by the switches on the operation panel 3. A display for performing WYSIWYG is performed not on the CRT 24, but on the LED display unit of the operation panel 3, thereby obtaining the same operation and effect as in the above embodiment.

In the above embodiment, the laser beam printer 1 is used as the output device. However, the output device is not limited to a printer such as the laser beam printer 1. The output device may be another host computer in the same manner as described above to construct a distribution system for an electronic mail or voice mail.

In the flow chart of FIG. 5, the input group name is searched, and the attribute information such as user names and IDs belonging to the input group name is loaded from the external storage 25 to the RAM 31. However, if an input group name is, e.g., a floor name, attribute information such as user names and IDs belonging to the designated floor name may be loaded from the external storage 25 to the RAM 31.

A header page and print information are transmitted by multi-address calling to the printers or host computers installed on the designated floor.

If the input group name is, e.g., a post, attribute information such as a user name and ID belonging to the designated post is loaded from the external storage 25 to the RAM 31, and a header page and print information can be transmitted by multi-address calling to the printer or host computer of a user having the designated post.

In addition, if the input group name is a range of posts such as an assistant section manager or higher post, attribute information such as user names and IDs belonging to this range of posts is loaded from the external storage 25 to the RAM 31, and a header page and print information can be transmitted by multi-address calling to printers or host computers used by the users having the designated range of posts.

Figure 6:
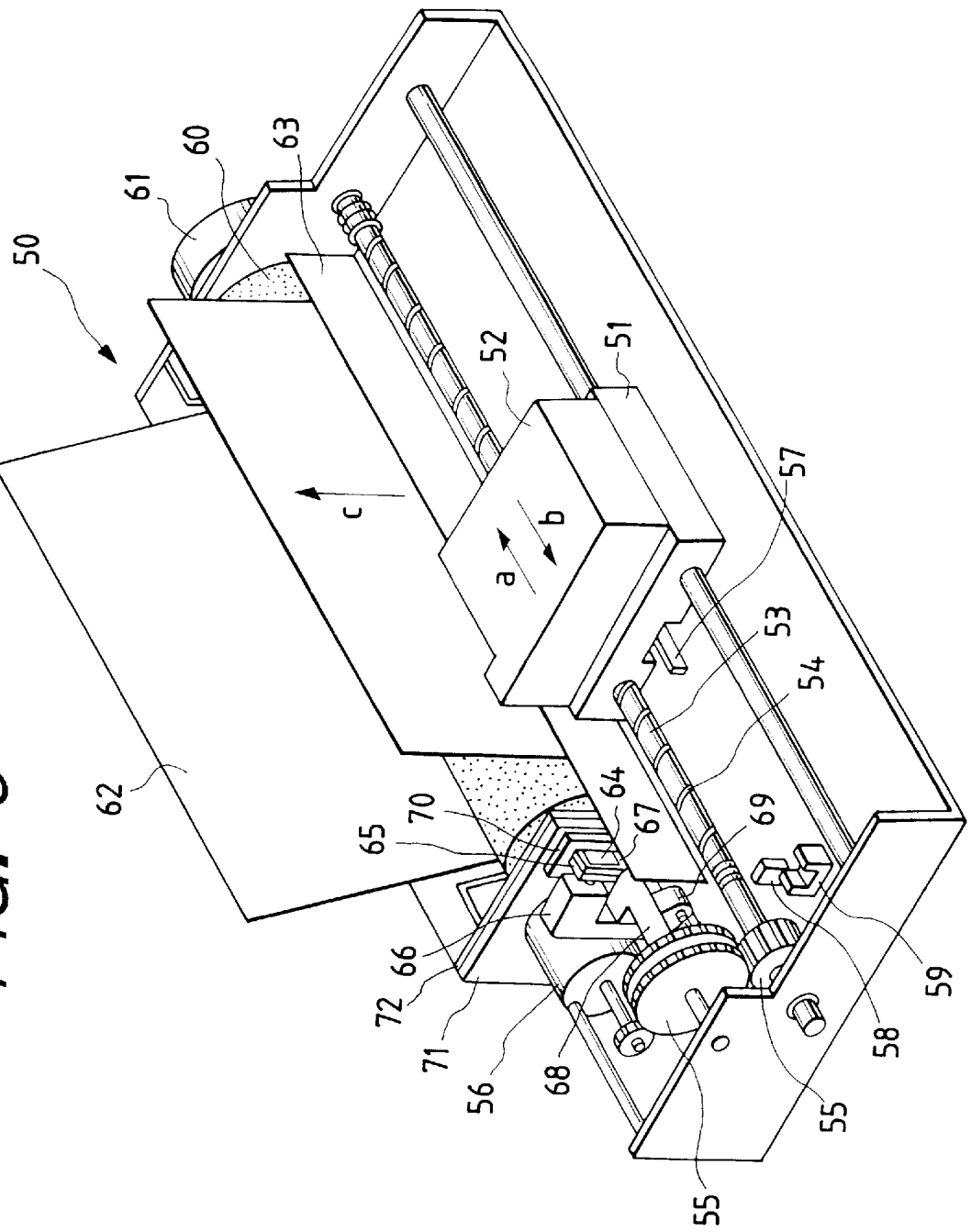
FIG. 6 is a perspective view showing the outer appearance of an ink-jet printer as an example of another printer controller according to the embodiment of the present invention.

FIG. 6 is a perspective view showing the internal structure of an ink-jet printer as another output device.

In an ink-jet printer 50, a carriage 51 supports an ink-jet cartridge 52 and is engaged with a spiral groove 54 of a lead screw 53 through a pin (not shown). The lead screw 53 is coupled to a paper feed motor 56 through an appropriate number of sprockets 55. The carriage 51 is movable in a direction indicated by an arrow a or b in accordance with forward or reverse rotation of the paper feed motor 56. More specifically, a lever 57 is disposed below the carriage 51, and the position of the lever 57 is detected through photocouplers 58 and 59 to detect the home position of the carriage 51. Detection of the home position of the carriage 51 allows switching of the rotational direction of the paper feed motor 56.

A carriage motor 61 is coupled to a platen 60. A recording paper sheet 62 wound on the platen 60 is fed in a direction of an arrow c by means of driving of the carriage motor 61. A paper press plate 63 presses the recording paper sheet 62 against the platen 60 throughout the entire movable area of the carriage 51.

A cap member 64 caps the entire surface of a recording head and is supported by a support member 65. A suction means 66 draws air or residual ink from the recording head through a cap opening 67. A suction lever 68 initiates suction and is moved together with a cam 69 engaged with the carriage 51. The movement of the suction lever 68 is controlled by a known transmission means such as clutch switching for a drive force from the paper feed motor 56. A cleaning blade 70 is movable back and forth through a member 71, and a main body support plate 72 supports the cleaning blade 70 and the member 71.

Figure 7:
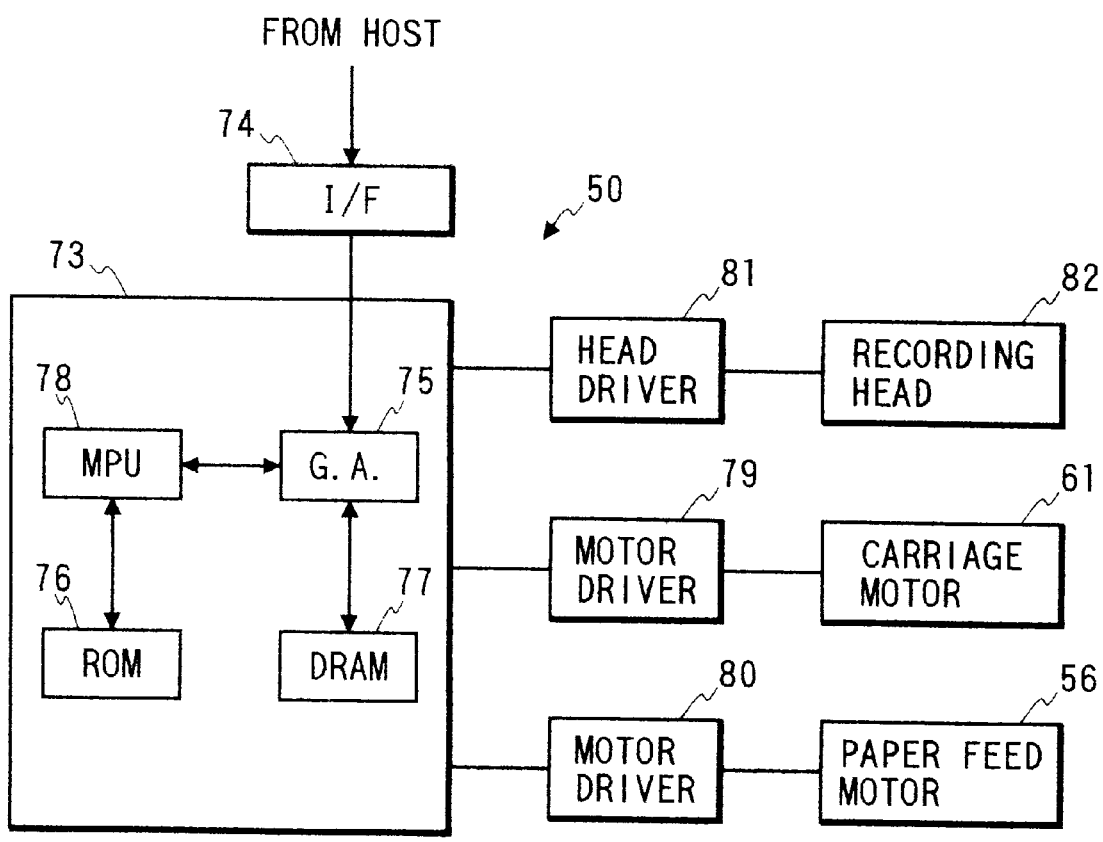
FIG. 7 is a system block diagram of the printer controller (ink-jet printer) in FIG. 6 according to the embodiment of the present invention.

FIG. 7 is a block diagram of the above ink-jet printer. A control system 73 of the ink-jet printer 50 comprises a gate array (G.A.) 75 for controlling input/output information with respect to the host computer through an interface (I/F) 74, a ROM 76 storing predetermined font data, the document processing programs in FIGS. 3 to 5, and various types of information used in the host computer, a DRAM 77 which can store input information and serves as a work area, and an MPU 78 for controlling these components. The MPU 78 is arranged to communicate with the host computer through the interface 74. The storage information stored in the DRAM 77, resource information, and the print information stored in the ROM 76 can be notified to the host computer.

In the ink-jet printer 50 having the above arrangement, when input information from the host computer connected to a predetermined network through the interface 74 is supplied to the gate array 75, the input information is converted into output information under the control of the MPU 78. The carriage motor 61 and the paper feed motor 56 are driven through the motor drivers 79 and 80, and at the same time the output information is fed to a head driver 81. Therefore, a recording head 82 is driven to execute printing.

In this ink-jet printer 50, the ROM 76 and the DRAM 77 have the same function as that of the printer ROM 42 and the printer RAM 41 in FIG. 2. The MPU 78 has the same function as that of the printer CPU 44 in FIG. 2. The same effect as in the above embodiment can be obtained, thereby achieving the prescribed object.

As described above, according to the embodiment, when a user inputs an output command once, predetermined information can be simultaneously transmitted to a plurality of terminal devices (printers or other host computers), thereby minimizing the labor of the document distributor.

A storage medium such as the program ROM 36 used in the information processing apparatus 22 of this embodiment will be described with reference to FIG. 11.

Figure 11:
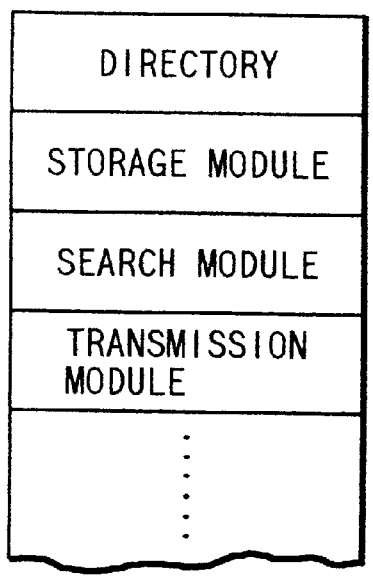
FIG. 11 is a view showing the memory map of a storage medium storing control programs according to the embodiment of the present invention.

FIG. 11 is a memory map of a recording medium storing control programs of the embodiment of the present invention.

The storage medium storing control programs for storing attribute information associated with IDs and users of a plurality of apparatuses which receive information through a bidirectional interface, searching the memory for IDs belonging to the designated attribute information, and transmitting the information to the plurality of searched apparatuses may store program codes of at least a "storage module", a "search module", and a "transmission module", as shown in FIG. 11.

The "storage module" is a program module for storing attribute information of IDs and users of the plurality of apparatuses.

The "search module" is a program module for searching the memory for IDs of apparatuses belonging to the designated attribute information.

The "transmission module" is a program module for transmitting information to the plurality of apparatuses searched by the search module.

The recording medium is not limited to the ROM 36. A floppy disk, an optical disk, a magnetooptical disk, a CD-ROM, a CD-R, a magnetic tape, a nonvolatile memory card, or the like which can be detachably connected to a printer controller can also be used as a recording medium.

What is claimed is:

1. An information processing apparatus which communicates information with a plurality of other apparatuses connected thereto through a bidirectional interface, the plurality of other apparatuses including at least one of a printer and a host computer, said apparatus comprising:

storage means for storing, for each of the plurality of other apparatuses, respective attribute information including at least one user and network identification information identifying the respective other apparatus;

search means for searching the identification information stored in said storage means to identify any of the plurality of other apparatuses corresponding to designated attribute information as identified apparatuses; and transmission means for, after said search means has identified which of the plurality of other apparatuses are identified apparatuses, transmitting data to the identified apparatuses.

2. An apparatus according to claim 1, wherein said bidirectional interface is a local area network.

3. An apparatus according to claim 1, wherein each network identification information is a network ID.

4. An apparatus according to claim 1, wherein the attribute information of the user is a user name.

5. An apparatus according to claim 1, wherein the attribute information of the user is a floor on which an apparatus used by the user is installed.

6. An apparatus according to claim 1, wherein the attribute information of the user is a post of the user.

7. An apparatus according to claim 1, wherein the attribute information of the user is a name of section/department to which the user belongs.

8. An apparatus according to claim 1, wherein said transmission means transmits data by multi-address calling to the identified apparatuses.

9. An apparatus according to claim 1, wherein said information processing apparatus is a host computer.

10. An apparatus according to claim 1, wherein the printer is an ink jet printer.

11. An apparatus according to claim 1, wherein the printer is a laser beam printer.

12. An apparatus according to claim 1, wherein said transmission means transmits the data based on a print command.

13. An apparatus according to claim 1, wherein said transmission means transmits the data including a header page.

14. An information processing method in an information processing apparatus which communicates information with a plurality of other apparatuses connected thereto through a bidirectional interface, the plurality of other apparatuses including at least one of a printer and a host computer, said method comprising the steps of:

storing, for each of the plurality of other apparatuses, respective attribute information including at least one user and network identification information identifying the respective other apparatus in a memory;

searching the identification information stored in the memory to identify any of the plurality of other apparatuses corresponding to designated attribute information as identified apparatuses; and after said searching step has identified which of the plurality of other apparatuses are identified apparatuses, transmitting information to the identified apparatuses.

15. A method according to claim 14, wherein the bidirectional interface is a local area network.

16. A method according to claim 14, wherein each network identification information is a network ID.

17. A method according to claim 14, wherein the attribute information of the user is a user name.

18. A method according to claim 14, wherein the attribute information of the user is a floor on which an apparatus used by the user is installed.

19. A method according to claim 14, wherein the attribute information of the user is a post of the user.

20. A method according to claim 14, wherein the attribute information of the user is a name of section/department to which the user belongs.

21. A method according to claim 14, wherein said transmission step comprises transmitting information by multi-address calling to the identified apparatuses.

22. A method according to claim 14, wherein the information processing apparatus is a host computer.

23. A method according to claim 14, wherein the printer is an ink jet printer.

24. A method according to claim 14, wherein the printer is a laser beam printer.

25. A method according to claim 14, wherein said transmission step transmits the data based on a print command.

26. A method according to claim 14, wherein said transmission step transmits the data including a header page.

27. A storage medium storing a control program for executing a method used in an information processing apparatus which communicates information with a plurality of other apparatuses connected thereto through a bidirectional interface, the plurality of other apparatuses including at least one of a printer and a host computer, wherein said method comprises the steps of:

storing, for each of the plurality of other apparatuses, respective attribute information including at least one user and network identification information identifying the respective other apparatus in a memory;

searching the identification information stored in the memory to identify any of the plurality of other apparatuses corresponding to designated attribute information as identified apparatuses; and after said searching step has identified which of the plurality of other apparatuses are identified apparatuses, transmitting information to the identified apparatuses.

28. A medium according to claim 27, wherein the bidirectional interface is a local area network.

29. A medium according to claim 27, wherein each network identification information is a network ID.

30. A medium according to claim 27, wherein the attribute information of the user is a user name.

31. A medium according to claim 27, wherein the attribute information of the user is a floor on which an apparatus used by the user is installed.

32. A medium according to claim 27, wherein the attribute information of the user is a post of the user.

33. A medium according to claim 27, wherein the attribute information of the user is a name of section/department to which the user belongs.

34. A medium according to claim 27, wherein said transmission step transmits information by multi-address calling to identified apparatuses.

35. A medium according to claim 27, wherein the information processing apparatus is a host computer.

36. A medium according to claim 27, wherein the printer is an ink jet printer.

37. A medium according to claim 27, wherein the printer is a laser beam printer.

38. A medium according to claim 27, wherein said transmission step transmits the data based on a print command.

39. A medium according to claim 27, wherein said transmission step transmits the data including a header page.

40. An information processing apparatus which communicates information with a plurality of terminal devices, said information processing apparatus comprising:

storage means for storing a plurality of identifiers, each identifier being unique to a different one of the plurality of terminal devices, and each identifier comprising a network identifier;

group registration means for registering, as one group, at least two of the plurality of identifiers stored in said storage means;

output command means for generating an output command for outputting predetermined information to those terminal devices corresponding to the one group; and transmission means for, after said group registration means has registered the one group, transmitting the predetermined information to the terminal devices corresponding to the one group when the output command is generated by said output command means.

41. An apparatus according to claim 40, wherein said storage means comprises user name storage means for storing user names of said terminal devices, and said group registration means determines and registers the one group on the basis of the user names.

42. An apparatus according to claim 40, further comprising header addition means for adding an information header as part of the predetermined information when the predetermined information is transmitted by said transmission means.

43. An apparatus according to claim 40, wherein the plurality of terminal devices include a printer.

44. An apparatus according to claim 43, wherein the printer is an ink jet printer.

45. An apparatus according to claim 43, wherein the printer is a laser beam printer.

46. An apparatus according to claim 40, wherein said transmission means transmits the data based on a print command.

47. An apparatus according to claim 40, wherein said transmission means transmits the data including a header page.

48. An information processing method operative in an information processing apparatus which communicates information with a plurality of terminal devices, said method comprising the steps of:
registering, as one group, at least two of a plurality of identifiers, each stored identifier being unique to one of the plurality of terminal devices, and each stored identifier comprising a network identifier; and
after said registering step has registered the one group, transmitting the predetermined information to those terminal devices corresponding to the one group when an output command for outputting the predetermined information to the terminal devices corresponding to the one group is generated.

49. A method according to claim 48, further comprising storing user names together with the identifiers and registering the one group on the basis of the user names.

50. A method according to claim 48, further comprising adding an information header to the predetermined information and transmitting resultant information to each terminal device corresponding to the one group.

51. A method according to claim 48, wherein the plurality of terminal devices include a printer.

52. A method according to claim 51, wherein the printer is an ink jet printer.

53. A method according to claim 51, wherein the printer is a laser beam printer.

54. A method according to claim 48, wherein said transmission step transmits the data based on a print command.

55. A method according to claim 48, wherein said transmission step transmits the data including a header page.

56. A system comprising:
an information processing apparatus which communicates information with a plurality of other apparatuses connected thereto through a bidirectional interface; and
said plurality of other apparatuses, including at least one of a printer and a host computer,
wherein said information processing apparatus comprises:
storage means for storing, for each of said plurality of other apparatuses, respective attribute information including at least one user and network identification information identifying the respective other apparatus;
search means for searching the identification information stored in said storage means to identify any of said plurality of other apparatuses corresponding to designated attribute information as identified apparatuses; and
transmission means for, after said search means has identified which of said plurality of other apparatuses are identified apparatuses, transmitting data to the identified apparatuses.

57. A system according to claim 56, wherein the printer is an ink jet printer.

58. A system according to claim 56, wherein the printer is a laser beam printer.

59. A system according to claim 56, wherein said transmission step transmits the data based on a print command.

60. A system according to claim 56, wherein said transmission step transmits the data including a header page.

61. A control program for executing a method used in an information processing apparatus which communicates information with a plurality of other apparatuses connected thereto through a bidirectional interface, the plurality of other apparatuses including at least one of a printer and a host computer, wherein said method comprises the steps of:
storing, for each of the plurality of other apparatuses, respective attribute information including at least one user and network identification information identifying the respective other apparatus in a memory;
searching the identification information stored in the memory to identify any of the plurality of other apparatuses corresponding to designated attribute information as identified apparatuses; and
after said searching step has identified which of the plurality of other apparatuses are identified apparatuses, transmitting information to the identified apparatuses.

62. A program according to claim 61, wherein the printer is an ink jet printer.

63. A program according to claim 61, wherein the printer is a laser beam printer.

64. A program according to claim 61, wherein said transmission step transmits the data based on a print command.

65. A program according to claim 61, wherein said transmission step transmits the data including a header page.

* * * * *

UNITED STATES PATENT AND TRADEMARK OFFICE
CERTIFICATE OF CORRECTION

PATENT NO. : 6,009,485

DATED : December 28, 1999

INVENTOR(S) : TOSHIHIKO HOSOTSUBO

It is certified that error appears in the above-identified patent and that said Letters Patent is hereby corrected as shown below:

<u>COLUMN 11</u>

```
Line 10, "include" should read --includes--.
Line 43, "include" should read --includes--.
```

Signed and Sealed this

Sixteenth Day of January, 2001

Attest:

Q. TODD DICKINSON

*Attesting Officer*  *Commissioner of Patents and Trademarks*